May 7, 1968  R. I. WOLKENSTEIN  3,381,548
PLANETARY GEARING

Filed July 25, 1966  2 Sheets-Sheet 1

INVENTOR
ROBERT I. WOLKENSTEIN

BY Wenderoth, Lind n Ponack
ATTORNEYS

May 7, 1968   R. I. WOLKENSTEIN   3,381,548
PLANETARY GEARING

Filed July 25, 1966   2 Sheets-Sheet 2

INVENTOR
ROBERT I. WOLKENSTEIN

BY *Wenderoth, Lind & Ponack*
ATTORNEYS

United States Patent Office 3,381,548
Patented May 7, 1968

3,381,548
PLANETARY GEARING
Robert Ignaz Wolkenstein, Rethen (Leine), Germany, assignor to Eisenwerk Wulfel, Hannover-Wulfel, Germany
Filed July 25, 1966, Ser. No. 567,584
4 Claims. (Cl. 74—801)

ABSTRACT OF THE DISCLOSURE

A planetary gear transmission including a planet pinion block of three gears made up of two parts. The two side gears are of the same size and their teeth extend from one end to the other of the block, the central portion having a smaller radial dimension to permit internal splines on the third, or middle, gear to mate with the teeth and be rotated so that the teeth will axially locate the third gear. The gear transmission further includes independently mounted ring gears in mesh with the two side planet gears.

The invention relates to a planetary gearing with a revolving or stationary planet pinion support and two or more symmetrically distributed planet pinion blocks, each block consisting of a central planet pinion mating with the central sun gear and two lateral planet pinions each engaging with an interior gear wheel.

Such a gearing which is provided preferably with three planet pinion blocks is known. It is suited for relatively high transmission and has the special advantage of a load distribution accomplished symmetrically on each planet pinion axis. Despite these advantages the ordinary use of this gearing always failed, since no one succeeded in balancing or equalizing its two interior gear wheels in a satisfactory way corresponding to an even load as much as possible of the usual three planet pinion blocks with all its teeth engagement which frequently cannot be commonly geared and besides in the case of hardening display different warpings. Furthermore, it was not possible to provide a sensible and economical construction of its planet wheel blocks. The construction of such a block, for instance, could be accomplished from one piece, but not only the gear tooth system of the lateral plant pinions would have to be exactly aligned towards each other, but also these gear tooth systems would have to have at the same time with the gear tooth systems of the central planet pinions an equal tooth position. Such requirements could, if at all possible, only be met by a high expenditure.

Also, the manufacture of the planet pinion blocks from two parts, so that between the gear tooth system of the lateral planet pinions a shaft collar remains, larger in diameter and serving for the sliding on and fastening of the central planet pinion, could not change the fact that the already mentioned requirements for an exact aligning or balancing of all gear tooth systems would have to be met and also it would be problematic insofar as between the shaft collar and the central planet pinion a connection would have to be devised having torsional strength and resisting sliding-off. It would be feasible, indeed, to comply with all of these requirements more easily, if each planet pinion block would be made and assembled from three parts, namely, the two lateral planet pinions which are separated from each other and the central planet pinion, but in addition to an especially high expenditure for construction, difficulties would arise in regard to the connection of all the individual parts.

The invention has an object to remove all the above mentioned disadvantages for a planetary gearing of the above type, to provide for the complete utilization of the carrying capacity of all of its gear tooth systems and also to provide an especially suitable construction of its planet pinion blocks, so as to obtain a construction which compared with the hitherto known embodiments has an increased transmission capability and displays essential advantages from the viewpoint of construction and economics.

A further object is to provide a construction in which the two interior gear wheels cooperating with the two lateral planet pinions of each planet pinion block are supported independently of each other by independently adjustable, radial, but mainly circumferentially acting compensating elements directly supported in the gear housing, and in which furthermore such a special embodiment of each planet pinion block is provided that its lateral planet pinions are formed as a pinion in one piece with a central recess corresponding exactly to the width of the central planet pinion to be installed and extending to about half of the tooth height of the pinion, while the planet wheel to be put on is provided with a bore having notches which correspond with the pinion recess, so that the pinion is slidable over the gear tooth system of the pinion shaft and within the recess of the same after turning for half a pitch is guided definitely centrically as well as axially. The hollow spaces after the gear and the pinion shaft have been positioned together, existing between the slightly turned pinion gear tooth system and the notches of the planet pinion bore, are about double trapezoid in shape, for the purpose of locking the gear and the pinion shaft together either with a rigid or elastic compounds or with inserted transmission elements.

With the above and other objects in view which will become apparent from the detailed description below, a preferred modification of the invention is shown in the drawings, in which.

Figure 1:
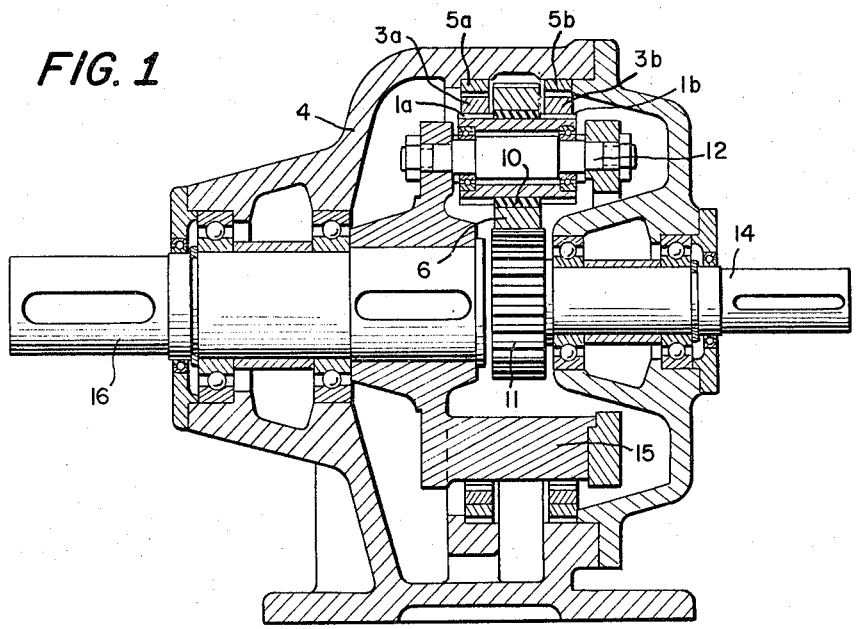
FIGURE 1 is a cross-sectional view with parts shown in elevation of the sun planet gear.
Figure 2:
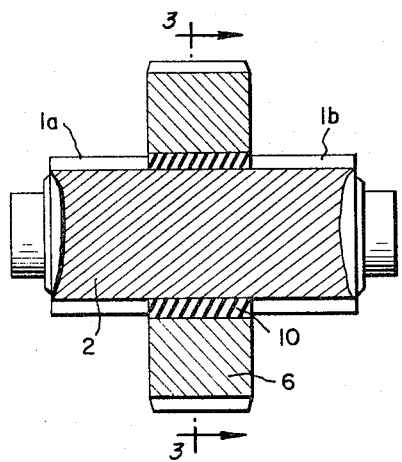
FIGURE 2 is a cross-sectional view of a shaft upon which the lateral planet pinions may be constructed and upon which the central planet pinion may be mounted.
Figure 3:
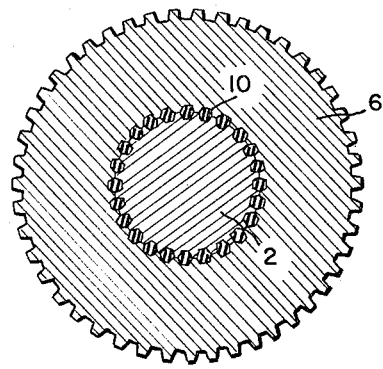
FIGURE 3 is a cross-sectional view taken upon section line 3—3 of FIGURE 2.
Figure 4:
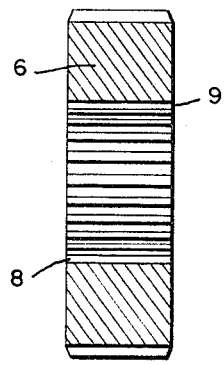
FIGURE 4 is a cross-sectional view of the central planet gear.
Figure 5:
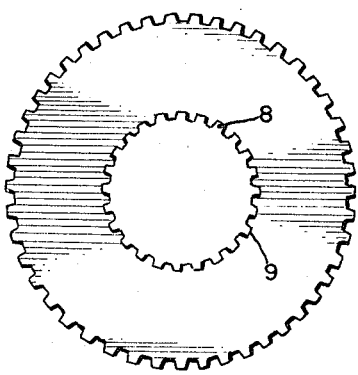
FIGURE 5 is a side view of the gear shown in FIGURE 4.

The sun planet gear assembly according to FIGURE 1 is preferably provided with three planet pinion blocks arranged in the planet pinion support 15 and each block has a larger central planet pinion 6 and two smaller lateral planet pinions 1a and 1b as shown in FIGURES 2 and 3. The lateral planet pinions 1a and 1b of each planet pinion block engage respectively the interior teeth of gear wheels 3a and 3b, while each central planet pinion 6 meshes with the central sun pinion 11 fixed to the driving shaft 14. The drive of the gearing is accomplished via the planet pinion support 15 fixed to the driven shaft 16.

According to the invention the two interior gear wheels 3a and 3b cooperating with the lateral planet pinions 1a and 1b of each planet pinion block are supported separately adjustable and independently of each other by direct compensating elements 5a and 5b supported in the gear housing 4. The direct support of such compensating elements 5a and 5b being in twin arrangement within the gear housing 4 makes the arrangement of additional intermediate members as for instance articulated gear coupling shells etc. dispensable. Besides, the compensating elements 5a and 5b provide a free radial, but above all a free tangential adjustability of the interior gear wheels 3a and 3b, since they are separately and completely independent from each other according to the equilibrium of forces of the mesh of the teeth located parallel in the performance flow.

Figure 6:
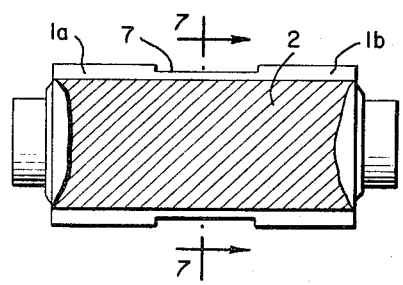
FIGURE 6 is a cross-sectional view with parts in elevation of the shaft upon which the lateral planet pinions are cut and the central recess provided for the central planet gear.

Furthermore, the construction of each planet pinion block is devised in such a way that its two lateral planet pinions 1a and 1b engaging with the interior gear wheels 3a and 3b are furthermore unitary, as for instance on the toothed planet pinion shaft 2 having a central recess 7, as illustrated in FIG. 6, corresponding exactly to the breadth of the planet pinion 6 to be mounted thereon. The recess 7 which has to be constructed before forming the teeth upon the pinion shaft 2, extends to about half of the tooth height of the gear tooth systems 1a and 1b. The gear tooth systems may be constructed in one course by milling, cutting or grinding over the entire length of the pinion shaft.

Figure 7:
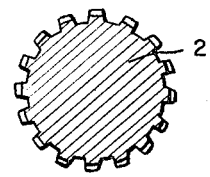
FIGURE 7 is a cross-sectional view taken upon section line 7—7 of FIGURE 6.

Planet pinion 6 is provided in its bore 9, fitting to the seating of the pinion recess 7, with a number of coarsely constructed notches 8 corresponding to the number of pinion teeth, having a depth which facilitates the sliding of the planet pinion 6 over the gear tooth system of the pinion shaft 2. See also FIGURE 7 which is a cross section through FIGURE 6. As soon as the planet pinion 6 moves over the recess 7 of the pinion shaft 2, it is turned in a circumferential direction for half a pitch so that it is now guided radially on the tooth fragments in the pinion shaft recess 7 and also axially between the bilaterally higher protruding complete gear tooth systems 1a and 1b, thereby being guided within the recess 7 absolutely securely, tightly and very exactly. In this position, between the width of the tooth present in the recess 7 and the notches 8 of the planet pinion 6 the double trapezoid shaped hollow spaces 10 (FIGURE 3) are present, which therefore may be utilized for obtaining a connection having torsional strength between planet pinion shaft 2 and the planet pinion 6, which may be filled with a rigid or elastic compound for instance with pre-prepared insertable transmission elements. No difficulties are encountered to maintain the tooth position of the pinion of the gear tooth systems 1a and 1b for the toothing of the planet pinion 6 for each planet pinion block by means of a very simple device before and during the pouring, e.g., filling out in always the same way, as well as being capable of an exact and repeated checking. By using an elastical connection an additional compensating effect for the gearing is obtained.

Finally it may be said that the notches 8 of the planet pinion 6 in single or double geared planet pinion shaft 2 all have to correspond to the tooth diagonal of one of the two pinion gear tooth systems 1a or 1b and that the connection suggested according to the present invention between a smaller and a larger pinion may be basically used also for other applications and devices, as for instance for a required adjustability or the like and is also usable for only unilaterally set up pinions.

I claim:
1. Planet gearing comprising a housing, a sun gear, a planet pinion support in said housing, a plurality of symmetrically arranged planet pinion blocks on said support, each of said blocks comprising a central planet pinion meshing with said sun gear, and a lateral planet pinion located at each side of said central pinion, an interior gear wheel for cooperating with each lateral planet pinion supported independently of each other by directly supported compensating elements so as to be independently adjustable and supported in said housing to operate radially but mainly in circumferential direction, a shaft having said lateral planet pinions in each planet pinion block, said shaft having a central recess corresponding and extending to about half a tooth height of the gear teeth of said lateral pinions, said central planet pinion having a bore corresponding to said recess provided with notches, so that said central pinion is slidable to said recess and after turning for half a pitch is guided centrally and axially, and locking means in the double trapezoid shaped hollow spaces present after combining the teeth of the lateral pinions with the central pinion teeth between the half pinion gear tooth system and the notches of the central planet pinion bore for locking the rotation of said lateral pinions and said central pinion.

2. Planet gearing as set forth in claim 1 wherein said locking means are rigid.

3. Planet gearing as set forth in claim 1 wherein said locking means are an elastic compound.

4. Planet gearing as set forth in claim 1 wherein said locking means are inserted transmission elements.

References Cited

UNITED STATES PATENTS

| 1,678,798 | 7/1928 | Asprooth et al. | 74—801 |
| 2,386,367 | 10/1945 | Taylor | 74—410 |
| 2,460,629 | 2/1949 | Fawick | 74—801 |
| 2,845,696 | 8/1958 | De Bourgues | 29—159.2 |
| 2,868,037 | 1/1959 | Hindmarch | 74—801 X |
| 2,868,040 | 1/1959 | Chamberlin | 74—801 |
| 3,090,258 | 5/1963 | Zink et al. | 74—801 |
| 3,192,799 | 7/1965 | Pamplin | 74—411 X |

DONLEY J. STOCKING, *Primary Examiner.*

THOMAS C. PERRY, *Examiner.*